United States Patent
Heilmann et al.

(10) Patent No.: US 6,760,421 B2
(45) Date of Patent: *Jul. 6, 2004

(54) TELEPHONY SECURITY SYSTEM

(75) Inventors: Craig Heilmann, San Antonio, TX (US); Todd Beebe, Katy, TX (US)

(73) Assignee: SecureLogix Corporation, San Antonio, TX (US)

( * ) Notice: Subject to any disclaimer, the term of this patent is extended or adjusted under 35 U.S.C. 154(b) by 411 days.

This patent is subject to a terminal disclaimer.

(21) Appl. No.: 10/035,639

(22) Filed: Oct. 19, 2001

(65) Prior Publication Data

US 2002/0090073 A1 Jul. 11, 2002

Related U.S. Application Data

(63) Continuation of application No. 09/593,888, filed on Jun. 14, 2000, now Pat. No. 6,320,948, which is a continuation of application No. 09/210,347, filed on Dec. 11, 1998, now Pat. No. 6,249,575.

(51) Int. Cl.[7] .................................................. H04M 3/00
(52) U.S. Cl. ....................... 379/189; 379/196; 379/198; 379/200
(58) Field of Search .............................. 379/93.24, 156, 379/157, 188, 189, 196, 198, 93.09, 93.11, 93.02, 200, 265.01, 265.02, 265.09; 713/201, 202, 153, 154

(56) References Cited

U.S. PATENT DOCUMENTS

| | | | |
|---|---|---|---|
| 4,332,982 A | 6/1982 | Thomas | 379/200 |
| 4,639,557 A | 1/1987 | Butler et al. | 379/29.02 |
| 4,653,085 A | 3/1987 | Chan et al. | 379/93.14 |
| 4,783,796 A | 11/1988 | Ladd | 379/88.19 |
| 4,876,717 A | 10/1989 | BarRon et al. | 713/202 |
| 4,905,281 A | 2/1990 | Surjaatmadja et al. | 713/202 |
| 4,965,459 A * | 10/1990 | Murray | 379/189 |
| 5,018,190 A | 5/1991 | Walker et al. | 379/93.02 |
| 5,276,529 A | 1/1994 | Williams | 358/406 |
| 5,276,687 A | 1/1994 | Miyamoto | 370/420 |
| 5,276,731 A | 1/1994 | Arbel et al. | 379/211.02 |
| 5,311,593 A | 5/1994 | Carmi | 713/162 |
| 5,345,595 A * | 9/1994 | Johnson et al. | 455/410 |
| 5,351,287 A | 9/1994 | Bhattacharyya et al. | 379/93.02 |

(List continued on next page.)

FOREIGN PATENT DOCUMENTS

| | | |
|---|---|---|
| CA | 2094412 | 4/1993 |
| CA | 2221365 | 11/1997 |
| WO | WO 96/22000 | 7/1996 |
| WO | WO 98/17072 | 4/1998 |
| WO | WO 98/53635 | 11/1998 |

OTHER PUBLICATIONS http://www.tlogic.com/penetration.html.
http://www.m-tech.ab.ca/security/penetration.
http://www.m-tech.ab.ca/products/secmod/.
http://www.sandstorm.net/phonesweep:*Sandstorm* Enterprises, Inc. "Introducing PhoneSweep".
http://www.bruck-inc.com/html/security/pentesting.htm:"Penetration Test".

*Primary Examiner*—Ahmad F. Matar
*Assistant Examiner*—Bing Bui
(74) *Attorney, Agent, or Firm*—Jenkens & Gilchrist

(57) ABSTRACT

A system and method of telephony security for controlling and logging access between an enterprise's end-user stations and their respective circuits into the public switched telephone network (PSTN). A security policy, i.e., a set of security rules, are defined for each of the extensions, the rules specifying actions to be taken based upon at least one attribute of the call on the extension. Calls are detected and sensed on the extensions to determine attributes associated with each call. Actions are then performed on selected calls based upon their attributes in accordance with the security rules defined for those extensions.

6 Claims, 13 Drawing Sheets

U.S. PATENT DOCUMENTS

| | | | |
|---|---|---|---|
| 5,436,957 A | | 7/1995 | McConnell .............. 379/88.23 |
| 5,495,521 A | * | 2/1996 | Rangachar ................. 379/93.04 |
| 5,510,777 A | | 4/1996 | Pilc et al. .................. 340/5.27 |
| 5,535,265 A | * | 7/1996 | Suwandhaputra ........ 379/93.28 |
| 5,557,742 A | | 9/1996 | Smaha et al. ............... 713/200 |
| 5,581,228 A | | 12/1996 | Cadieux et al. .......... 340/146.2 |
| 5,606,604 A | * | 2/1997 | Rosenblatt et al. ......... 379/198 |
| 5,623,601 A | | 4/1997 | Vu .............................. 713/201 |
| 5,627,886 A | * | 5/1997 | Bowman .................... 379/111 |
| 5,684,957 A | | 11/1997 | Kondo et al. ............... 713/201 |
| 5,706,338 A | * | 1/1998 | Relyea et al. ............... 379/189 |
| 5,745,555 A | | 4/1998 | Mark ...................... 379/93.03 |
| 5,805,686 A | | 9/1998 | Moller et al. ............... 379/198 |
| 5,805,803 A | | 9/1998 | Birrelle et al. .............. 713/201 |
| 5,812,763 A | | 9/1998 | Teng .......................... 713/201 |
| 5,826,014 A | | 10/1998 | Coley et al. ................. 713/201 |
| 5,838,682 A | | 11/1998 | Dekelbaum et al. ........ 370/401 |
| 5,854,889 A | | 12/1998 | Liese et al. .................... 714/43 |
| 5,864,613 A | | 1/1999 | Flood .......................... 379/188 |
| 5,864,666 A | | 1/1999 | Shrader ....................... 713/201 |
| 5,892,903 A | | 4/1999 | Klaus .......................... 713/201 |
| 5,898,830 A | | 4/1999 | Wesinger, Jr. et al. ....... 713/201 |
| 5,907,602 A | * | 5/1999 | Pell et al. ............... 379/114.14 |
| 5,918,019 A | | 6/1999 | Valencia ..................... 709/227 |
| 5,923,849 A | | 7/1999 | Venkatraman .............. 709/224 |
| 5,931,946 A | | 8/1999 | Terada et al. ............... 713/201 |
| 5,944,823 A | | 8/1999 | Jade et al. ................... 713/201 |
| 5,946,386 A | * | 8/1999 | Rogers et al. .......... 379/265.09 |
| 5,949,864 A | | 9/1999 | Cox ............................ 379/189 |
| 5,950,195 A | | 9/1999 | Stockwell et al. .............. 707/4 |
| 5,960,177 A | | 9/1999 | Tanno ......................... 709/229 |
| 6,061,798 A | | 5/2000 | Coley et al. ................. 713/201 |
| 6,098,172 A | | 8/2000 | Coss et al. ................... 713/201 |
| 6,154,775 A | | 11/2000 | Coss et al. ................... 709/225 |

\* cited by examiner

| AMPHENOL | PINSET | ALIAS | COMMENT |
|---|---|---|---|
| J0 | 1-4 | STATION1 | PBX LINE 1 |
| J0 | 5-8 | STATION2 | PBX LINE 2 |
| J0 | 9-12 | STATION3 | PBX LINE 3 |
| J0 | 13-16 | STATION4 | PBX LINE 4 |
| J0 | 17-20 | STATION5 | PBX LINE 5 |
| J0 | 21-24 | STATION6 | PBX LINE 6 |
| J0 | 25-28 | STATION7 | PBX LINE 7 |
| J0 | 29-32 | STATION8 | PBX LINE 8 |
| J0 | 33-36 | STATION9 | PBX LINE 9 |
| J0 | 37-40 | STATION10 | PBX LINE 10 |
| J0 | 41-44 | STATION11 | PBX LINE 11 |
| J0 | 45-48 | INTCOM | OFFICE INTERCOM |
| J1 | 1-2 | CO1 | ANALOG 1FB |
| J1 | 3-4 | CO2 | ANALOG 1FB |
| J1 | 5-6 | CO3 | ANALOG 1FB |
| J1 | 7-8 | CO4 | ANALOG 1FB |

FIG. 5B

| LINE-ALIAS | EXTENSION | COMMENT |
|---|---|---|
| STATION1 | 210-420-6250 | 2ND FLOOR RM 219 |
| STATION2 | 210-420-6251 | 2ND FLOOR RM 221 |
| STATION3 | 210-402-6252 | 2ND FLOOR RM 223 |
| STATION4 | 210-402-6600 | 9TH FLOOR RM 956 |
| STATION5 | 210-402-6601 | 9TH FLOOR RM 958 |
| STATION6 | 210-402-6602 | 9TH FLOOR RM 960 |
| STATION7 | 210-402-6603 | 9TH FLOOR RM 962 |
| STATION8 | 210-402-6560 | 2ND FLOOR RM 220 |
| STATION9 | 210-402-6561 | 2ND FLOOR RM 222 |
| STATION10 | 210-402-6562 | 2ND FLOOR RM 224 |
| STATION11 | 210-402-6563 | 2ND FLOOR RM 226 |
| CO1 | 210-402-7000 | 2ND FLOOR FAX (RECEPTION) |
| CO2 | 210-402-7001 | 2ND FLOOR FAX RM 219 |
| CO3 | 210-402-7002 | 9TH FLOOR FAX RM 956 |
| CO4 | 210-402-7003 | DIAL-IN LINE |

FIG. 6B

| GROUP | ELEMENTS | COMMENT |
|---|---|---|
| SALES | 210-402-62XX | 2ND FLOOR SALES CREW |
| | 210-402-65XX | 2ND FLOOR SALES CREW |
| ENGINEERING | 210-402-66XX | 9TH FLOOR ENGINEERING LAB |
| | CO4 | LAB ADMIN DIAL-UP |
| FAX | CO1 | 2ND FLOOR FAX (RECEPTION) |
| | CO2 | 2ND FLOOR FAX RM 219 |
| | CO3 | 9TH FLOOR FAX RM 956 |
| VOICE-ONLY | SALES 210-402-66XX | VOICE-ONLY LINES |
| DATA-ONLY | CO4 | DATA-ONLY LINES |

FIG. 7

| RULE | SOURCE | DESTINATION | TYPE | ACTION | TRACK | DATE | TIME | COMMENT |
|---|---|---|---|---|---|---|---|---|
| 1 | VOICE-ONLY | 1* | ANY | DENY | ALERT | ANY | 8PM-4AM | DENY AFTER-HOURS LONG DISTANCE, LOG CALL |
| 2 | VOICE-ONLY | ANY | VOICE | ALLOW | SHORT | ANY | ANY | ALLOWS OUTBOUND VOICE CALLS, LOG CALL |
| 3 | ANY | VOICE-ONLY | VOICE | ALLOW | SHORT | ANY | ANY | ALLOWS INBOUND VOICE CALLS, LOG CALL |
| 4 | ANY | VOICE-ONLY | !VOICE | DENY | ALERT | ANY | ANY | ALERT ON POTENTIAL HACKERS, LOG CALL |
| 5 | FAX | ANY | FAX | ALLOW | SHORT | ANY | ANY | LOCKS DOWN INBOUND FAXES, LOG CALL |
| 6 | ANY | FAX | FAX | ALLOW | SHORT | ANY | ANY | LOCKS DOWN OUTBOUND FAXES, LOG CALL |
| 7 | FAX | ANY | !FAX | DENY | ALERT | ANY | ANY | ALERT WHEN FAX IS ABUSED, LOG CALL |
| 8 | 680-8272 | CO4 | MODEM | ALLOW | SHORT | ANY | ANY | DIAL-UP ALLOWED FROM CRAIG'S, LOG CALL |
| 9 | ANY | CO4 | ANY | DENY | ALERT | ANY | ANY | ALERT WHEN HACKER DIALS UP, LOG CALL |
| 10 | ANY | ANY | ANY | DENY | LONG | ANY | ANY | CATCH AND LOG ALL OTHER CALLS, LOG CALL |

FIG. 8A

TELEPHONY SECURITY SYSTEM

CROSS-REFERENCE TO RELATED APPLICATION

This application is a continuation of U.S. patent application Ser. No. 09/593,888 entitled TELEPHONY SECURITY SYSTEM filed Jun. 14, 2000, now U.S. Pat. No. 6,320,948 which is a continuation of U.S. patent application Ser. No. 09/210,347 entitled TELEPHONY SECURITY SYSTEM filed Dec. 11, 1998, and is related to U.S. Pat. No. 6,249,575 entitled TELEPHONY SECURITY SYSTEM filed Dec. 11, 1998, to U.S. Pat. No. 6,226,372 entitled A TIGHTLY INTEGRATED COOPERATIVE TELECOMMUNICATIONS FIREWALL AND SCANNER WITH DISTRIBUTED CAPABILITIES filed Dec. 8, 1999, to U.S. patent application Ser. No. 09/572,516 entitled A SYSTEM AND METHOD TO DISCRIMINATE CALL CONTENT TYPE filed May 17, 2000, to U.S. patent application Ser. No. 09/672,530 entitled A SYSTEM AND METHOD FOR BRINGING AN IN-LINE DEVICE ON-LINE AND ASSUMING CONTROL OF CALLS filed Sep. 28, 2000, and to U.S. patent application Ser. No. 09/709,592 entitled A SYSTEM AND METHOD FOR ENCAPSULATION, COMPRESSION AND ENCRYPTION OF PCM DATA filed Nov. 10, 2000, each assigned to the assignee of the present application.

TECHNICAL FIELD

The invention relates generally to telecommunications access control systems and particularly to a telephony security system for controlling and logging access between end-user stations and their respective circuits into the public switched telephone network (PSTN).

BACKGROUND

"Policy-based security management" refers to the application of a governing set of rules at strategically located points (chokepoints) for the purpose of enforcing security boundaries between two or more networks, such that only those events meeting certain criteria may pass between them, while all other events are denied passage. For network operations, this filtering process selectively discards packets in order to control access to a network, or to resources such as files and devices. Variations and improvements of this basic theme have resulted in devices known as firewalls today—network components that provide a security barrier between networks or network segments. Much like a guard at a checkpoint, the firewall strictly enforces rules specified within an established policy for what shall pass on a case-by-case basis. The policy may alternatively dictate that other actions may apply as well, such as logging the event and/or sending an urgent electronic mail message notifying appropriate personnel of the event.

Security professionals consider firewalls to be essential in the protection of an enterprise's private network or virtual private network from access to computers by unauthorized personnel or "hackers," Like any security measure, however, firewalls are not foolproof. Firewalls provide no protection for traffic routed around them, as is often the case when modems are used while connected to internal networks i.e., circumvention of the firewall through unprotected channels, such as through telephone lines or extensions normally used for voice or fax. Clearly, there is a need for a system and method for controlling access to an enterprise's network through telephony resources that otherwise cannot be sufficiently protected by traditional firewall technology.

In addition to security needs relevant to computer networks, there are issues in the toll fraud, phone misuse, call accounting and bill reconciliation arenas that warrant similar protections. Currently, a need exists to address the full spectrum of security issues across an enterprise that may span the entire globe. A need exists for a scalable and manageable system and a method for controlling and logging access to an enterprise's telephony resources.

SUMMARY OF THE INVENTION

The present invention, accordingly, provides a system and method for performing security access control functions for an enterprise's telephone circuits between end-user stations and their respective circuits into the public switched telephone network (PSTN). In the most basic configuration, inbound and outbound calls are allowed or denied (i.e., blocked or "hung-up") according to a rule-set that is managed by a security administrator. In one aspect, the system combines call-progress monitoring, caller-ID (CND) and/or automatic number identification (ANI) decoding, digital line protocol reception and decoding, pulse dial detection, and tone detection (DTMF and MF) with microprocessor control, access-control logic, and call-interrupt circuitry.

The system and method of the present invention performs centrally managed, enterprise-wide enforcement of an enterprise's telephony security policy and real-time notification in selected instances of attempted security breaches. The system utilizes a specialized device to monitor and control access to every telephone station, fax machine, and modem line within the enterprise that is routed through the device.

Specific attributes identified by the control device pertaining to all inbound and outbound calls determine whether certain calls, in accordance with a predefined security policy, are allowed, denied ("hung-up"), logged, and/or initiate additional actions such as email or pager notification. Attributes captured by the device include, as examples: station extension; inbound caller-ID information (when available); outbound number dialed; call-type (i.e., fax, modem, or voice); keywords via voice-recognition, demodulated modem and/or fax data; and time and date stamp.

The rule-set for control of call traffic by the device defines a security policy that governs how telephones may be used within the enterprise. Each rule, upon meeting certain criteria, initiates appropriate security action(s).

In one embodiment, a system and method of telephony security is provided that controls call access into and out of the enterprise on a per line (station extension or trunk line) basis. A security policy, i.e., a set of access rules, are defined for each of the ports; the rules specifying actions to be taken based upon at least one attribute of the call present on the line. In this embodiment, calls are tracked and sensed on a per line basis, extracting specific attributes that are available at the time of the call. Actions are then performed based upon the detected call's attributes in accordance with the security policy that applies to that line.

BRIEF DESCRIPTION OF THE DRAWINGS

A better understanding of the telephony security system of the present invention may be had by reference to the drawing figures, wherein:

FIG. 5B is a table illustrating a simplified example Amphenol pinout for a small business enterprise;

FIG. 6B is a table illustrating a simplified example line map for a small business enterprise;

FIG. 7 is a table illustrating an example group list configuration for a small business enterprise;

FIG. 8A is a table illustrating an example security policy for a business enterprise;

DETAILED DESCRIPTION

Figure 1:
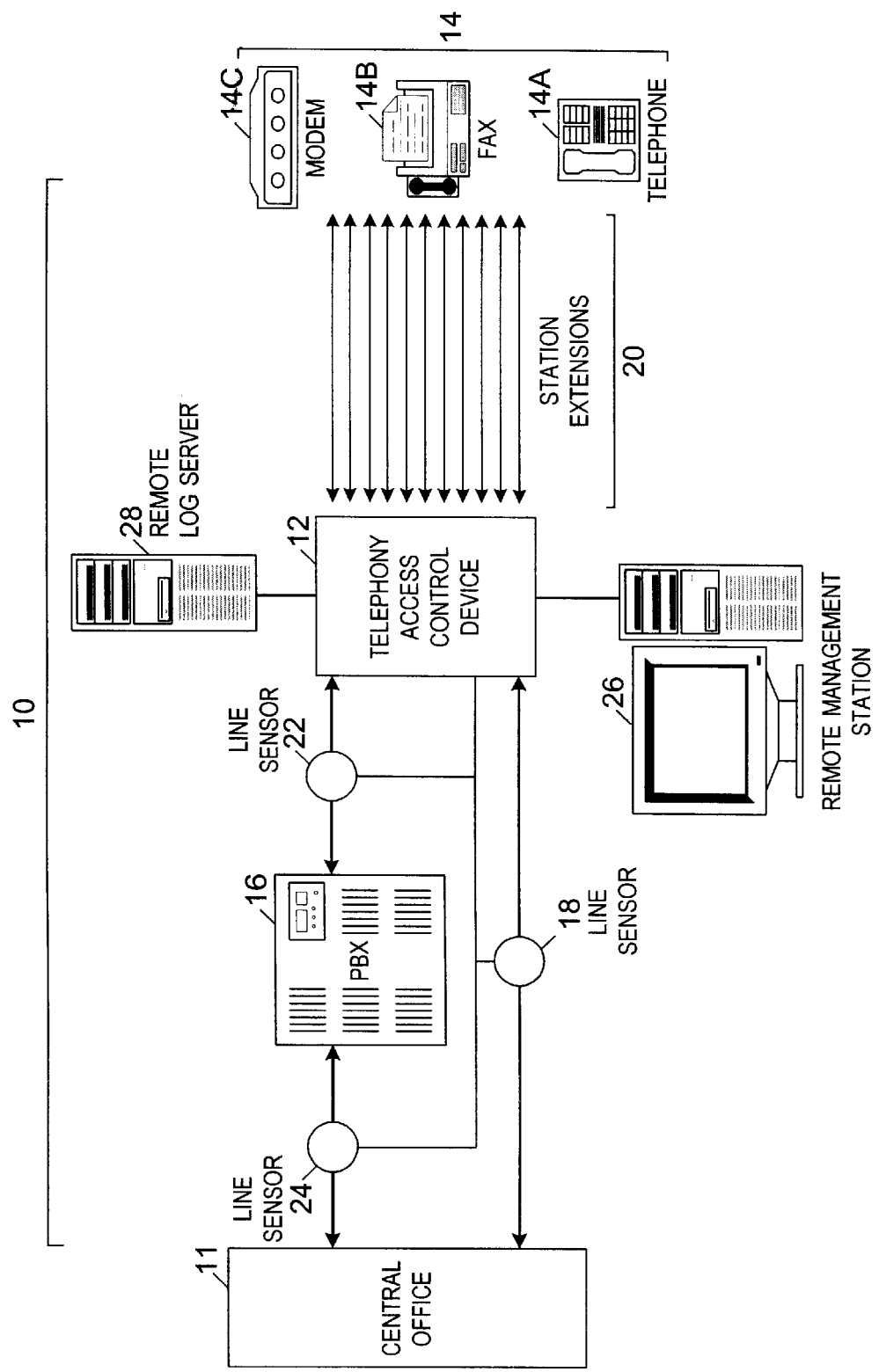
FIG. 1 is a schematic block diagram of a telephony security system of the present invention.

In FIG. 1, the reference numeral 10 refers to a telephony security system of the present invention. The system 10 consists primarily of an access control device 12 connected in-line between end-user stations 14 of an enterprise and the stations' connections into the public switched telephone network (PSTN) at sensor points 18 (direct connect lines), 22 (station-side of a PBX), and 24 (trunk-side of a PBX).

Also in FIG. 1, numerals 14a, 14b, and 14c refer to end-user stations 14 connected to the access control device 12, representing as examples, one or more telephones 14a, fax machines 14b and modems 14c. The modems 14C may support desktop or portable personal computers, for example. Individual extensions 20 connect each of the stations 14 with the device 12. As represented by sensor point 22 and its corresponding line, it is understood that the device 12 is configured to map the individual extensions 20 through the device to their respective wire pairs (not shown) within the PBX 16, and also to one or more telephone lines, as indicated at sensor point 18, connected to a central office 11.

Several configurations are possible, whereby connectivity on the PSTN-side of the access control device 12 may be any combination of PBX trunk-side connection at point 24, a PBX station-side connection at point 22, and direct connects at point 18. A completely PBX station-side implementation, for example, might exclusively consist of Amphenol connectors (RJ-21X) (not shown), or other standard connectors and associated cabling, for interconnecting the PBX 16 with connection inputs of the device 12.

While not shown, it is understood that more than one network-addressable device 12 may be utilized within an enterprise, at one or more locations, whereby security is provided by the device(s) for traffic into and out of a private network or virtual private network of the enterprise.

A management station 26 is connected to the device 12 for consolidation, management, display or printing of call logs and for programming the security policy and other operational features of the device 12. Historical logging and archiving may be accomplished on the local management station 26, or stored via a network accessible log server 28.

The device 12 combines call-progress monitoring, caller-ID (CND) and/or automatic number identification (ANI) decoding, digital line protocol reception and decoding, pulse dial detection, and tone detection (DTMF and MF) with microprocessor control, access-control logic, and call-interrupt circuitry for implementing the desired access control functions. The inventive functions performed by the device 12, as further described below, may be implemented with commercially available components as will be understood by those skilled in the art. While also not shown, it is understood that the device 12 is controlled by computer programming instructions stored in memory within the device 12 and potentially other components of the system 10 connected to the device.

Figure 2:
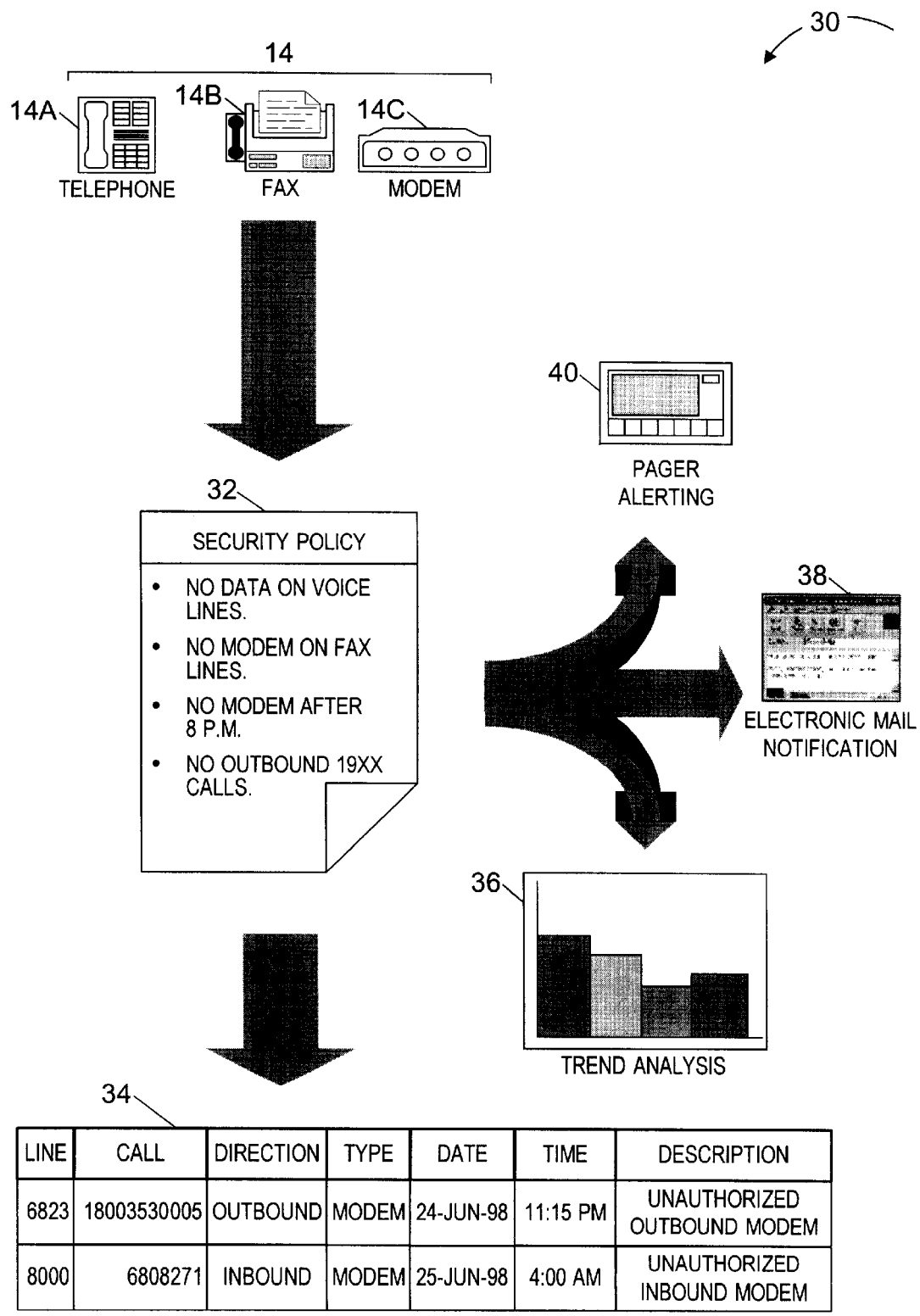
FIG. 2 is a functional block diagram of the system of FIG. 1 showing a simplified example security policy and corresponding actions and features.

Referring also to FIG. 2, a functional schematic 30 illustrates certain operational aspects of the system 10. An example (very simplified) security policy 32 is shown for controlling the flow of calls through the device 12. The policy 32 implements a rule-set that depends upon the type of equipment (phone 14a, fax machine 14b, modem 14c) being used on the extension for either inbound or outbound calls. It is understood that the rule-set is implemented by software instructions within the device 12 that may, for example, be programmed or modified at either the device or at the management station 26 (FIG. 1) located nearby or at a very remote distance therefrom.

As exemplified in FIG. 2, the security policy 32 dictates the type of actions associated with individual or groups of calls (e.g., allow, terminate, report), according to specified rules. In the present example, the rules specify that: (1) no data calls are permitted on designated voice lines; (2) no computer modem calls are permitted on designated fax lines; (3) no modem calls are permitted during a designated time (e.g., after 8 p.m.); and (4) no outbound call are permitted of a certain type (e.g., 19XX).

A call log 34 is generated for calls, designating, for example, the line (extension); the call number; the call direction (inbound, outbound); the type; the date and time; and the description (e.g., unauthorized outbound modem). Example reporting options include post-event or batch analysis 36 (trending), electronic mail notification 38 and pager alerting 40. While not shown, it is understood that the device 12 is able to communicate within the enterprise network with various hosts for providing the reporting functions.

Figure 3:
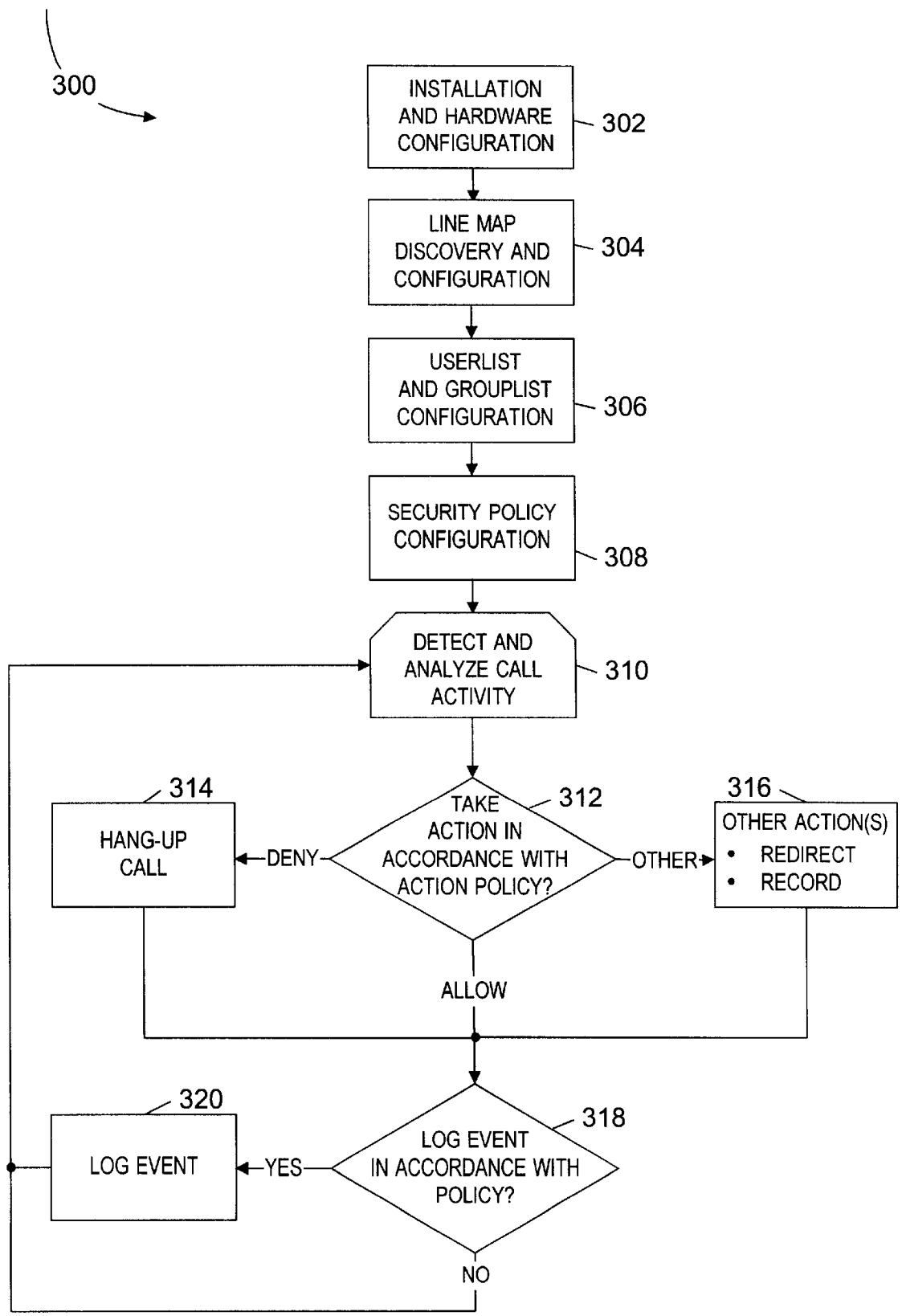
FIG. 3 is a flow diagram illustrating example installation, configuration and operational processes for the system of FIG. 1.

FIG. 3 is a process flow diagram 300 illustrating installation, configuration and operation processes for the system 10. Once installed and configured, it is understood that the system 10 is capable of operating in a continuous loop, detecting and analyzing call activity while simultaneously performing appropriate actions in accordance with the defined security policy. There are, however, a number of processes that are first performed as part of the installation and configuration of the system 10 within an enterprise or one or more of its locations.

Step 302 refers to the process of system installation and hardware configuration, discussed below with respect to FIG. 4 and FIGS. 5A–5B. Step 304 refers to the process of system line map discovery and configuration, discussed below with reference to FIGS. 6A and 6B. Step 306 refers to user list and group list configuration, discussed with below reference to FIG. 7. Step 308 refers to security policy configuration, discussed below with reference to FIG. 8A.

Steps 310–320 refer to the process of detecting and analyzing call activity, whereupon actions are taken for each call according to the security policy, discussed below and in further detail later with reference to FIG. 9.

In FIG. 3, the process of call detecting and analyzing call activity begins in step 310. For each station 14 connected by an extension 20 to the device 12, the device will capture and analyze call-activity, then consolidate and report details of the activity for further processing.

An aspect of this process involves the ability of the device 12 to distinguish between fax, modem, and voice call-types. Algorithms for call-type distinction are utilized that, in one implementation, distinguish the call-type based upon spectral analysis associated with typical fax and other data transmission protocols.

While not shown, it is understood that the "Action Policy" 312 and the "Event Policy" 318 are aspects of the overall security policy as discussed previously. In step 312, an "Action Policy" determines what action to take for a particular call, depending upon attributes of the call as determined in step 310. The rule-set for the "Action Policy" in step 312 may be determined and programmed to meet the security needs of the enterprise, which may include allowing the call, denying the call, or performing some other specific action such as redirecting the call to another port (step 316). In step 314, a denied call is terminated ("Hang Up Call"). Policy may also dictate that an event is logged (step 318) and what detail the log entry should include. While not shown, it is understood that there will be different levels of log entries, ranging from very brief to verbose.

Example rule-sets for the "Action Policy" and the "Log Event Policy" are discussed below with reference to FIG. 8A.

Installation and Hardware Configuration

Figure 4:
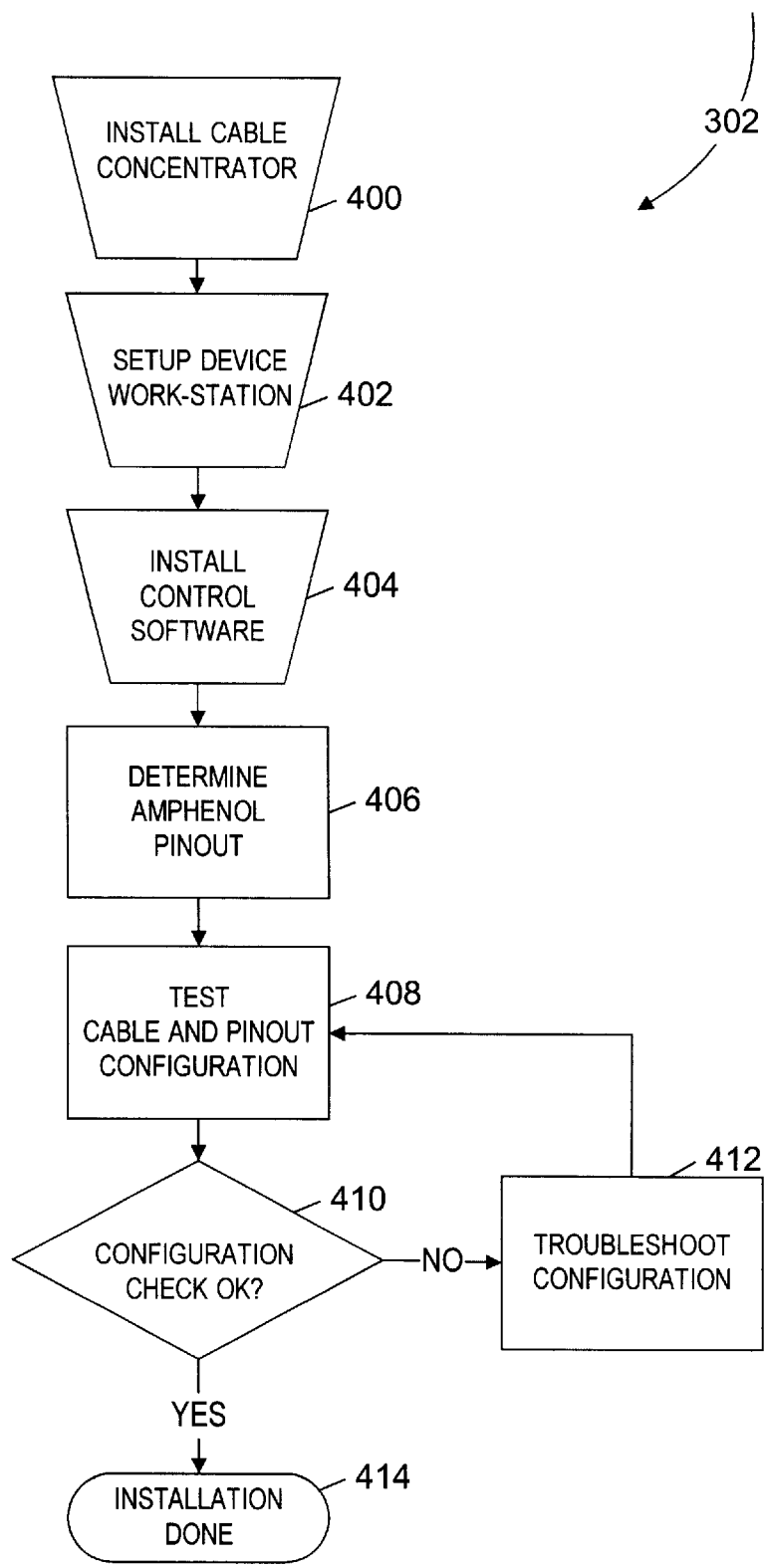
FIG. 4 is a flow diagram illustrating details of an example installation and hardware configuration process for the system of FIG. 1.

FIG. 4 illustrates the process 302 of system installation and hardware configuration. In step 400, a cable concentrator (not shown) is installed to connect the device 12. Because the access control device 12 is positioned in-line between the end-user stations 14 and the PSTN (or PBX), cabling must be routed to and from the access control device 12 and the point of interconnection with the telephone network. In the case of a PBX station-side implementation, 25-pair wire cables terminated with Amphenol connectors leading from the PBX would be re-routed to one side of a[n?] cable concentrator 22, while cables on the other side of the cable concentrator 22 would complete the original circuits by routing to their respective 66-type blocks ("punch-down blocks"). Switches; placed in-line for each wire-pair in the cable concentrator 22, are controlled by the access control device 12, providing the capability for hanging up the call (for analog lines only). The combination of the cable concentrator and the associated switches and associated control logic are collectively referred to as a line sensor 22.

In step 402, the remote management station 26 is set up, whereby a personal computer, meeting certain performance specifications, is acquired and configured with an operating system, booted, and ready for operation, In step 404, software required to operate the access control device 12, including for example defining and maintaining the security policy, is installed onto the remote management station 26. Although not shown, it is understood that installation of control software may include writing firmware instructions to line sensors 22 as required.

In step 406, a process is performed that determines Amphenol connector pinouts so that the individual extensions 20 are properly connected through the device 12 to the pairs from the PBX 16 or from the CO 18. The process utilizes an automated (or partially automated) mechanism for determining the correct Amphenol pinout, described in more detail below.

In steps 408–414, the cable and pinout connections are tested and troubleshooting is performed until complete. Testing of connectivity may take place manually by a service technician, or automatically through a software test algorithm, or a combination of both. After installed, and with power of, the access control device 12 should be transparent to the system; i.e., all wire-pairs should be terminated at the same points as they were prior to the installation. Should the installation process alter this mapping in any way, a service technician will have to determine the cause and correct it. Step 414 indicates the service technician has met these requirements.

Automated Amphenol Pinout Discovery

Figure 5A:
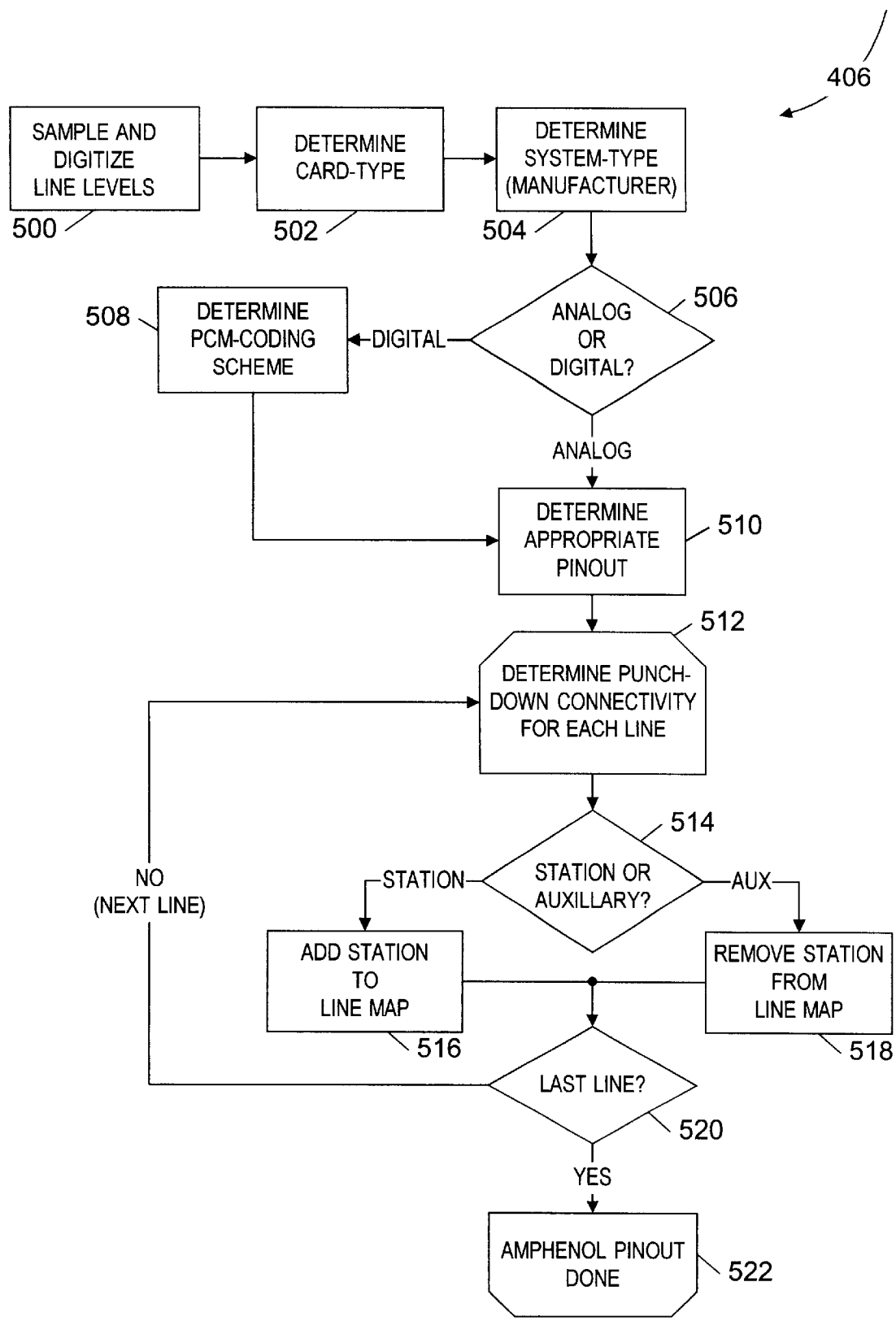
FIG. 5A is a flow diagram illustrating concepts for an automated Amphenol pinout discovery process for the system of FIG. 1.

FIGS. 5A and 5B illustrate the process 406 of automated Amphenol Pinout discovery, in particular with reference to steps 500–522 (FIG. 5A) and an example Amphenol connector pinout (FIG. 5D).

Line-side Amphenol connectors (not shown) have different pinouts depending on both the manufacturer and the subscriber line interface card (SLIC) they are attached to "Pinout" refers to the association of connector pins to lines. For example, line #1 may only use pins 1 and 2, or as many as pins 1 through 6; then line #2 would use either only pins 3 and 4, or pins 7 through 12; and so on. In the PBX environment, pinout designation is nonstandard because, for example, pins normally intended for line #2 might instead be used for "voice on hold" at the installer's discretion; the effect of which is that line #2 would actually use pins 13 through 18.

Installation of the device 12 is accompanied by a process for automatically determining card-types and manufacturers to help resolve this problem. One method, for example, is illustrated with reference to steps 500–522. In step 500, for each Amphenol connector on the station-side of the PBX 16, we sample and digitize line levels, providing a digital data stream to a processor (not shown) for each pin in the connector. This involves digitizing both analog and digital signal levels and presenting that information to a processor for reconstruction in digital form for analysis. Step 502 determines the card-type by analyzing line levels and signatures associated with known types. Step 504 determines the system-type (manufacturer) by analyzing signal patterns and distribution across all fifty pins associated with known types. In steps 506–508, if the card-type is digital, a determination is made of the PCM-coding scheme employed by the PBX 16. In step 510, given the information gathered so far, we determine the pinout for this particular Amphenol connector, i.e., assign pin numbers to lines (wire-pairs). In steps 512–522, for each line, we determine whether it is terminated with an end-user station (phone, fax, modem), or if it is assigned to an auxiliary device such as "voice an hold", voice mail, or intercom, 5B is a table illustrating an example Amphenol connector pinout configuration for a small business serviced by a single "Company X" PBX and several direct analog lines for fax and dial-up. Notice that each end-user station uses 2 wire-pairs (4 wires) and that the office intercom system was wired into pins 47–50 on Amphenol connector J0. Another Amphenol connector J1 was used to run the analog lines, each using only two pins per station.

Line Map Configuration

Figure 6A:
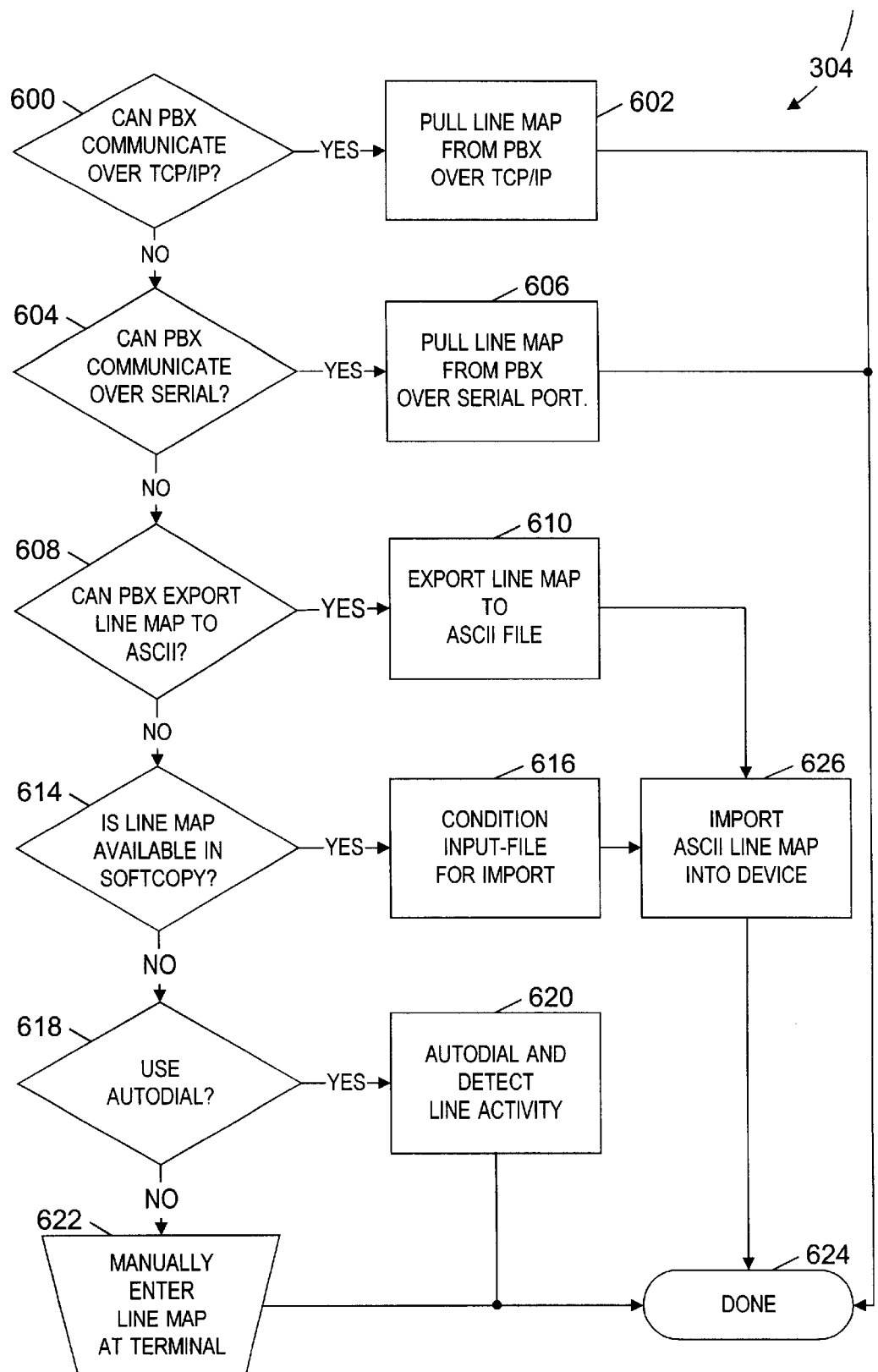
FIG. 6A is a flow diagram illustrating concepts for a line map discovery and configuration process for the system of FIG. 1.

FIGS. 6A and 6B illustrate the process 304 of line map configuration, in particular with reference to steps 600–624 (FIG. 6A), and an example line map (FIG. 6B).

After installation of the hardware and software, the system 10 must be configured to map individual stations 14 (extensions 20) to their respective wire-pairs inside the PBX 16, as well as assign telephone numbers to loops 18 that come direct from a central office. From the Amphenol connector pinout determination previously made, for example, it is known that pins 5 through 8 map to line #2 in the PBX 16. A line map can then be generated that indicates the association of a particular line to a station's extension (e.g., line #2 in the PBX 16 is associated with station 14 having an extension number "6253").

Steps 600–624 describe example line mapping processes for the mapping of ports in the PBX 16 to their respective end-user stations 14 (phone, fax, or modem), thereby generating a list of what ports belong to what station numbers. Recognizing that the configuration is maintained by the PBX 16 as well, it can be obtained from the PBX for use by the device 12, as described with reference to steps 600–612. In the case of directly connected loops 18, the extension number must be identified and included in the line map as well. Various methods are contemplated for obtaining this information, including aspects that can be automated with software.

In steps 618–620, an auto-dial process is utilized to determine the line map configuration whereby the device 12 sequentially dials a range of extensions, then detects and maps each telephone number to the station 14 that responded. For some analog lines, this process may be enhanced by transmitting and detecting sequences of out-of-band signals that only the device 12 can recognize, FIG. 6B is a table illustrating an example line map configuration for small business serviced by one PBX. After accessing the PBX and examining the punch-down blocks (not shown), an installer of the system 10 can create a line map for the system that might look like the table of FIG. 6B. Note that intercom lines are not included in the line map since intercom lines are not a security concern.

User List and Group List Configuration

Referring again to FIG. 3, after the line map is configured (step 304), a user list and group list configuration process is performed, as indicated in step 306. Specifically, the user of the system 10 can, using the line map, create a list of users, aliases, and groups of objects, thereby facilitating ease of management.

The user list and group list configuration defines an authentication mechanism that associates users with privileges, thus controlling access to the system 10 in the same manner that operating systems control access to resources. In addition, aliases can be created to associate meaningful names with inanimate objects, such as, in this particular case, telephone numbers; for example, it will be easier to work with an extension named "John" than to have to remember that extension 6253 is John's.

It is contemplated that the system 10 will make extensive use of groups, where objects of the same type can be collectively referred to by a meaningful alias. For example, the "Sales" group may consist of extensions pointed by the aliases "John," "Mary," "Robert," and all extensions in the range 6100 through 6199.

FIG. 7 illustrates an example group list configuration for the system 10. After the line map is defined, a group list can be created using the information in the line map. In this case, the stations are grouped according to office-department (sales and engineering) and by function (voice, fax, modem). Groups may overlap one another and even contain other groups entirely, as in the case of the "Voice-Only" group that contains the entire "Sales" group as well as all extensions within the range 210-402-66XX.

Security Policy Configuration

FIG. 8A illustrates details of an example security policy configuration for the system 10, as previously mentioned with respect to step 308 in FIG. 3.

Determining the security policy for the system 10 involves creating a set of rules, collectively referred to as a policy, that define what actions will be associated with particular groups of objects. For example, a rule might read "all outbound modem calls from the Engineering group, during the hours of 5 pm and 5 am, on any given day should be denied and logged."

Referring to FIG. 8A, an example security policy defines "Rules" that based upon call attributes of "Source," "Destination," "Call-type (e.g., fax, modem, voice)," "Date," and "Time," implement an "Action" (allow or deny the call) and a reporting function, "Track" (full spectrum from brief to verbose log entry).

In FIG. 8A, Rules 1–10 are explained as follows:

Rule 1

This rule states "Any long distance calls between 8pm and 4am on the phones in the Voice-Only group will be denied and an alert will be generated, notifying in real-time of the event". Note that the "1*" in the "Destination" column means a "1" followed by any other number. This rule might be used to prevent unauthorized persons, such as cleaning crews, from placing long distance calls from a business during late evening hours.

Rule 2

This rule states "Allow all outbound voice calls from the phones in the Voice-Only group any time on any day, and then log the call". This rule will allow business as usual while logging the call for accounting purposes.

Rule 3

This rule states "Allow all inbound voice calls to the phones in the Voice-Only group any time on any day, and then log the call". Again, this rule will allow business as usual while logging the call for accounting purposes.

Rule 4

This rule states "Any call into the Voice-Only group that is not voice will be denied and an alert will be generated, notifying in real-time of the event". Note that the "!" proceeding "voice" in the "Type" column means "NOT"; e.g., NOT voice. This rule might be used to alert security personnel to potential hacking attempts such as "war-dialing."

Rule 5

This rule states "Allow all outbound faxes from the Fax group any time on any day, and then log the call". This rule will allow normal fax traffic while logging the call for accounting purposes.

Rule 6

This rule states "Allow all inbound faxes to the Fax group any time on any day, and then log the call". Again, this rule will allow normal fax traffic while logging the call for accounting purposes.

Rule 7

This rule states "Any outbound call from the Fax group that is not a fax will be denied and an alert will be generated, notifying me in real-time of the event". Note that the "!" proceeding "fax" in the "Type" column means "NOT"; e.g., NOT fax. This rule might be used to alert security personnel to potential abuses of the fax lines, such as attempts to dial out using a modem of simply using the line for a voice call, Rule 8

This rule states "Only a modem from 680-8272 may dial into the phone named CO (the lab dial-up) and the call will be logged". This rule will lock down remote administration through a dial-up to the system administrator's home phone.

Rule 9

This rule states "Any call into the phone named C04 (the lab dial-up) will be denied and an alert will be generated, notifying me in real-time of the event". This rule might be used to alert a security administrator of unauthorized attempts to access the dial-up.

Rule 10

This catch-all rules states "Log all calls from anywhere to anywhere at any time of any day". This rule is typically appended to log all denied calls that do not fit into any of the preceding rules. At first glance, this rule seems counter-intuitive since it seems to deny any call from anywhere. This is not the case. Each rule is evaluated in sequential order, exiting immediately after any one rule matches the criteria.

Security Policy Enforcement

Figure 8B:
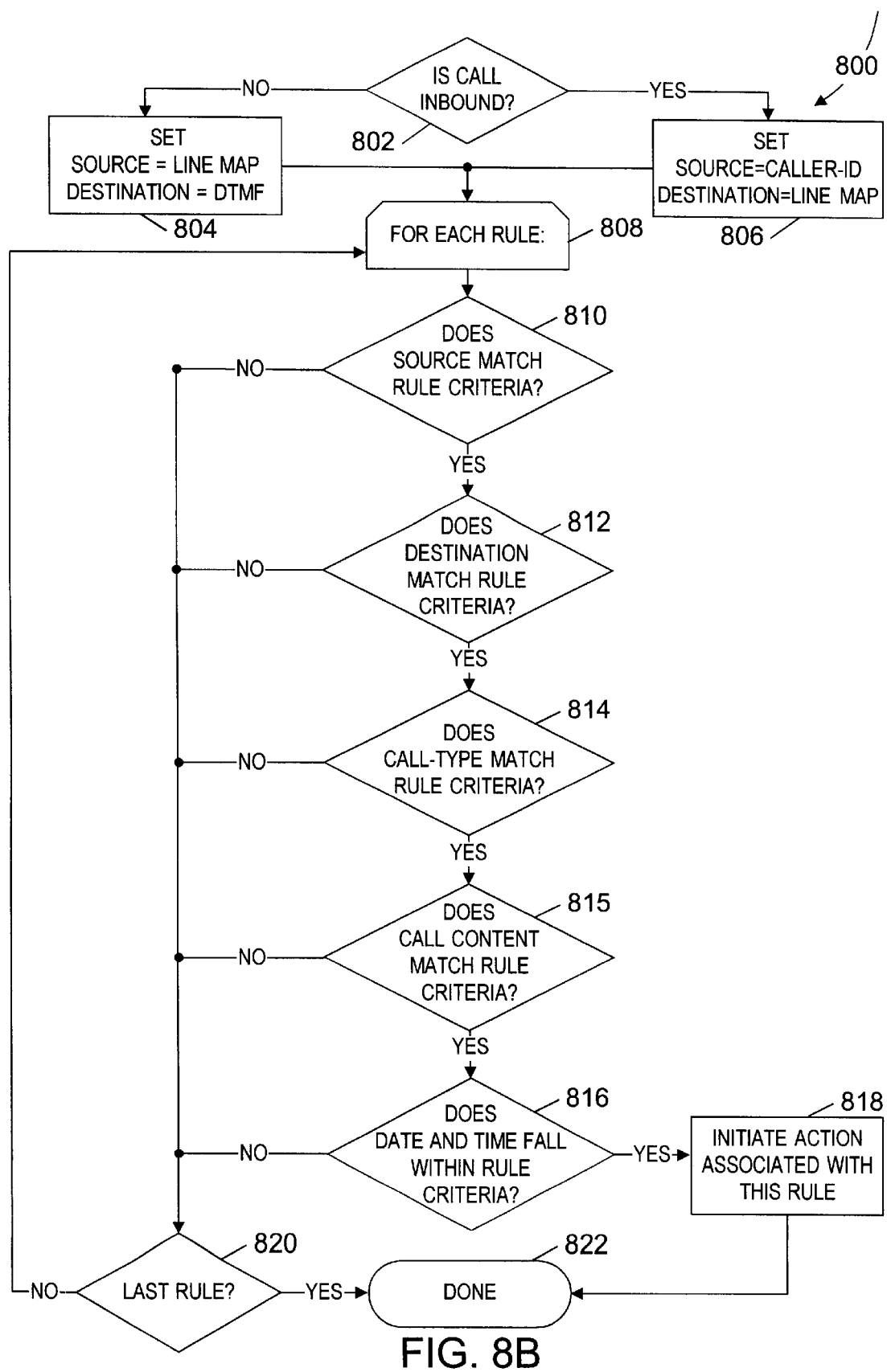
FIG. 8B is a flow diagram illustrating enforcement of a security policy in operation of the system of FIG. 1.

FIG. 8B illustrates an example process flow 800 for implementing a security policy of the system 10.

In step 802 a determination is made as to whether the call is inbound or outbound. In step 804, for outbound calls the system sets the source equal to the line map, such that the extension from which the call is being made can be identified. The destination is set equal to the user-dialed digits, indicating that a sensor or process within the device 12 will determine the destination number of the call, In step 806, for inbound calls the source is set equal to caller-ID so that a caller identification device can determine the source of the inbound call. The destination is set equal to the line map so that the destination extension can be determined according to the line map.

As indicated in steps 808–822, a process loop is applied for each rule until an action is indicated for the current rule, as indicated in step 818.

Referring now to both FIGS. 8A and 8B, operation of the system 10 to enforce a security policy is now described with reference to an example call scenario.

In this example scenario, assume that a person unhooks a fax line at an enterprise during the evening hours and attempts to dial out with a modem for the purpose of sending proprietary information outside the enterprise network to a competitor). First, the fax machine is unplugged, a modem is plunged in, and the user dials out from 402–7002 to a local ISP at 353-0005. The device 12 detects the call, determines that the call-type is a modem, collects call attributes into a record and applies the rules in FIG. 8:

Rule 1: The source number is not in the Voice-Only group, so skip to rule 2.

Rule 2: The source number is not in the Voice-Only group, so skip to 3.

Rule 3: The source number matches, but destination number is not in the Voice-Only group, so skip to 4.

Rule 4: The source number matches but not the destination, so skip to 5.

Rule 5: The source number is in the Fax group, and the destination matches, but the call-type is modem (not fax), so skip to 6.

Rule 6: The source number matches but destination is not in the Fax group, so skip to 7.

Rule 7: The source number matches, destination number matches, call-type is not fax, and the date and time match (any), so DENY the call, log it, and ALERT the security administrator of the attempted breach. At this point the process is done, and execution proceeds to handle the next call. If an event does not match any rule, it optionally may then be handled by a user-configurable "catch-all" rule.

Rules are evaluated for an event in sequential order until either one is met, or no rules meet their criteria. The criteria in this case can include, but is not limited to, any boolean combination (AND, OR, NOT) of the following: (1) source telephone number, numbers, or mask (e.g., 210-402-XXXX) where the source number is the number of the party initiating the call; i.e., the extension assigned to a station for outbound calls, or the number extracted from caller-ID (or any other means) for inbound calls; (2) destination telephone number, numbers, or mask where the destination number is the number of the party receiving the call; i.e., the extension assigned to a station for inbound calls, or the number dialed (DTMF decoded or by any other means) for outbound calls; (3) type of call, defined as either fax, modem, or voice; (4) date of call, defined as specific dates, ranges of dates, day(s)-of-week, or any combination thereof; and (5) time of call, defined as specific times, ranges of times, time(s)-of-day, or any combination thereof.

Detection and Analysis of Call Activity

Figure 9A:
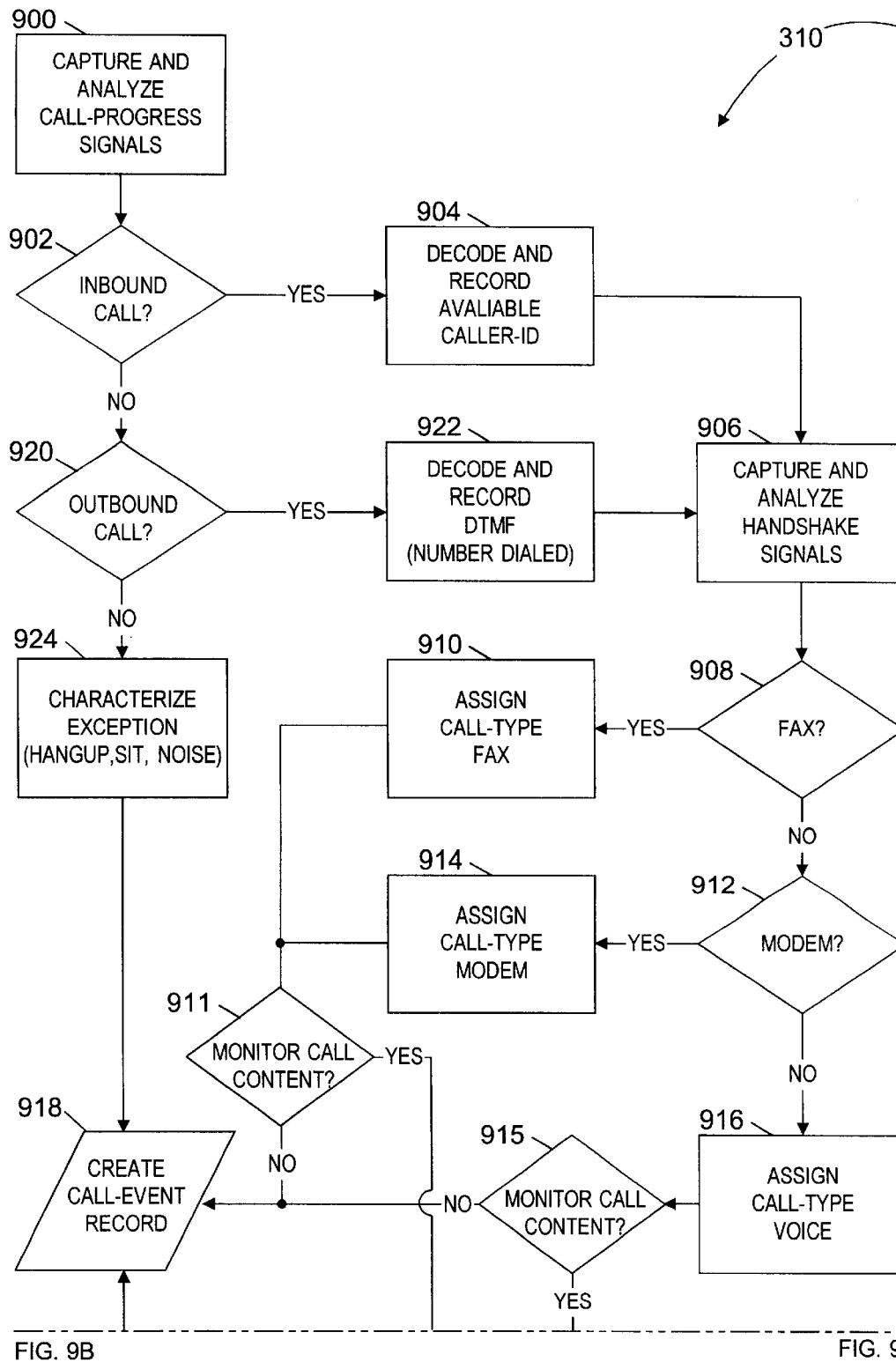
FIGS. 9A and 9B are a flow diagram illustrating details of an example detect and analyze call activity process for the system of FIG. 1.
Figure 9B:
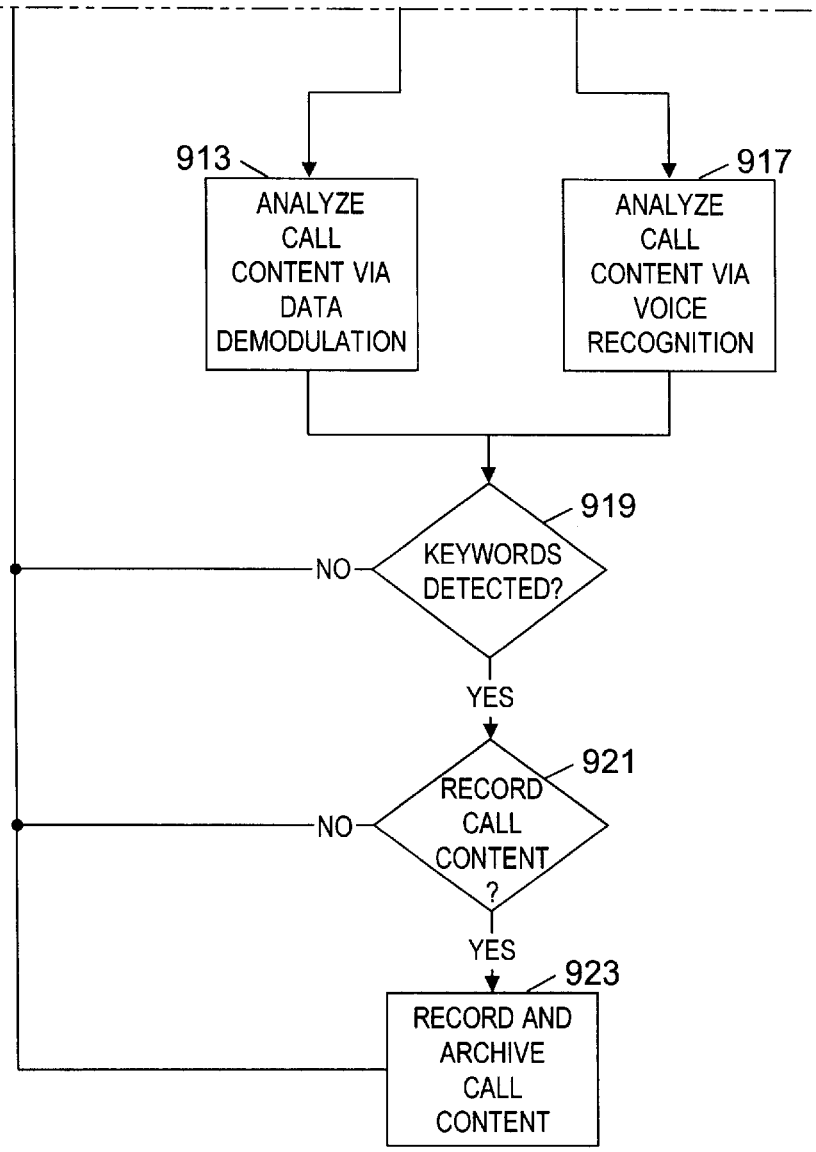

FIG. 9 illustrates details of an example process for detecting and analyzing call activity, as previously mentioned with respect to step 310 in FIG. 3.

Steps 900–924 illustrate that for each station under control of the device 12, the system 10 will capture and analyze call-activity, then consolidate and report details of the activity for further processing.

An aspect of the process involves the distinction between fax,- modem, and voice call-types, whereby "fax," "modem," and "voice" call-types are assigned to each call (steps 910, 914, 916) by capturing and analyzing the call signals (step 906), in the case of both inbound and outbound calls. A call event record is created (step 918) which is then utilized in implementing the security policy.

It is understood that the present invention can take many forms and embodiments. The embodiments shown herein are intended to illustrate rather than to limit the invention, it being appreciated that variations may be made without departing from the spirit of the scope of the invention. For example, any number of different rule criteria for the security policy may be defined. Different attribute descriptions and rule descriptions are contemplated. The algorithms and process functions performed by the system may be organized into any number of different modules or computer programs for operation on one or more processors or workstations within the system. Different configurations of computers and processors for the system are contemplated. The device 12 may be implemented on the trunk-side of the PBX, on the station-side of the PBX, or in both locations, possibly even complemented with computer telephony integration (CTI) interfaces to specific PBXs. The programs used to implement the methods and processes of the system may be implemented in any appropriate programming language and run in cooperation with any hardware device. The system may be used for enterprises as small as a private home or business with a few phone lines as well as for large enterprises with multiple PBX locations around the world, interconnected in one or more private networks or virtual private networks. In the case where multiple extensions are involved, it is understood that the extensions may be PBX extensions or direct line extensions.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A security breach alert system located in the connections between the end user stations and the PBX of an enterprise or between the PBX of an enterprise and a Public Switched Telephone Network, to enable said security breach or alert system to monitor both incoming and outgoing telecommunications directed to or originating from an enterprise, said security breach alert system comprising:

an access control device located in the connections between the end-user stations and the PBX of an enterprise or between the PBX of an enterprise and the Public Switched Telephone Network;

said access control device including a set of security rules defining one or more security actions to be applied to the incoming and outgoing telecommunications passing through said access control device wherein said one or more security actions are based on the one or more attributes of the incoming and outgoing telecommunications passing through said access control device;

said set of security rules defining one or more security actions to be applied to the incoming and outgoing calls passing through said access control device being selected from a group including:

no data transfer calls permitted on designated voice lines;

no outbound modem calls permitted on designated voice lines;

no modem calls permitted during a designated time period;

no outbound calls permitted to a certain destination identified by a predetermined numerical sequence;

no long distance calls permitted during a designated time period; and no outbound calls permitted from non-designated sources;

a computer telephony integration device, said computer telephony integration device being constructed and arranged for connection between said access control device and the PBX of the enterprise;

whereby said one or more security actions to be applied to said incoming and outgoing calls according to said set of security rules originate with said access control device and are passed to said computer telephony integration device for execution at the PBX of the enterprise.

2. The security breach alert system as defined in claim 1 wherein said one or more security actions are selected from a group including: allowing a call, denying a call, reporting a call, redirecting a call, monitoring call content, recording call content, logging a call, and providing an alert.

3. The security breach alert system as defined in claim 1 wherein said one or more attributes are selected from a group including: call-type, station extension identification, inbound caller identification, outbound number dialed, key words and call content, date of call, time of call, and duration of call.

4. The security breach alert system as defined in claim 1 wherein said access control device is connected to a management station located nearby or at a very remote distance therefrom within the enterprise for consolidation, management, display or printing of call logs, recorded call content or reports, and programming said security rules into said access control device.

5. The security breach alert system as defined in claim 1 wherein said security rules are programmed into said access control device at said access control device or from the management station located nearby or at a very remote distance therefrom within the enterprise.

6. The security breach alert system as defined in claim 1 whereby said one or more attributes of said incoming and outgoing calls all originate from said PBX and are passed from said computer telephony integration device to said access control device for selecting said one or more actions to be applied to said incoming and outgoing calls according to said set of security rules.

* * * * *